United States Patent
Sobey (10) Patent No.: US 6,674,591 B1
(45) Date of Patent: Jan. 6, 2004

(54) METHOD AND APPARATUS FOR IDENTIFYING A TRACK OF A ROTATING DISK USING EPR4 DATA EQUALIZATION AND DETECTION TECHNIQUES

(75) Inventor: Charles H. Sobey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 09/660,174

(22) Filed: Sep. 12, 2000

(51) Int. Cl.[7] .................................................. G11B 5/09
(52) U.S. Cl. .......................................... 360/49; 360/65
(58) Field of Search ........................ 360/60, 46, 77.12, 360/75; 375/290, 291

(56) References Cited

U.S. PATENT DOCUMENTS 5,737,142 A * 4/1998 Zook ............................ 360/49
5,822,143 A * 10/1998 Cloke et al. ................... 360/65

OTHER PUBLICATIONS

IEEE Journal of Solid State Circuits. Pai et al. "a 160–MHz Analog Front–End IC for EPR-IV PRML Magnetic Storage Read Channels". Nov. 1996, vol.31, No. 11 pp. 1803–1816.*
Conway et al., "A CMOS 260Mbps Read Channel with EPRML Performance", VLSI Circuits Conference in Hawaii, Jun. 10, 1998.
Nagaraj, et al., "A Median Peak Detecting Analog Signal Processor for Hard Disk Drive Servo", IEEE J. S–S Cir., vol. 30, No. 4, pp. 461–70 4/95.
Pai, et al., "A 160–MHz Analog Front–End IC for EPR-IV PRML Magnetic Storage Read Channels", IEEE J. S–S Cir., vol. 31, No. 11, pp.1803–1816, 11/96.
Shariatdoust, et al., "An Integrating Servo Demodulator for Hard Disk Drives", IEEE 1993 Custom Integrated Circuits Conf., pp. 10.6–1–5, 1993.
SSI 32P4101A PRML Read Channel with EPR4, 16/17 90,6/8) ENDEC, 4–Burst Se "Total Solutions 99" Data CD–ROM, Texas Instruments Apr. 8, 1999 pp. 1–67 especially pp. 12–16.
Tuttle, et al., "A 130Mb/s PRML Read/Write Channel with Digital–Servo Detection", IEEE Intntl Solid–State Circuits Conf., 1996, pp 64–65.
Tuttle, et al., "A 130Mb/s PRML Read/Write Channel with Digital–Servo Detection", ISSCC Slide Suplement, 1996, pp 48–50.
Alini, et al., "A 200MSample/s Trellis–Coded PRML Read/ Write Channel with Digital Servo", IEEE Intntl Solid–State Circuits Conf., 1997, pp 318–319, and 478–9.

* cited by examiner

Primary Examiner—David Hudspeth
Assistant Examiner—Glenda Rodriguez
(74) Attorney, Agent, or Firm—W. Daniel Swayze, Jr.; W. James Brady; Frederick J. Telecky, Jr.

(57) ABSTRACT

According to a broad aspect of the invention, a method and apparatus are presented for identifying a track (42) of a rotating disk (12) of a mass data storage device (10), using EPR4 data detection techniques. The track identification indicia (64) may be written more densely than the track identification indicia would have been written without using EPR4 data equalization techniques, wherein track identification indicia pulses (110–113) may at least partially overlap. The identification indicia (110–113) is read from the disk (12) using a read head (18), and processed using EPR4 data equalization techniques in an EPR4 Viterbi detector (92). The Viterbi detector (92) may be used also to detect data pulses (64) by switching its mode of operation from a track identification mode to a data detection mode.

20 Claims, 8 Drawing Sheets

METHOD AND APPARATUS FOR IDENTIFYING A TRACK OF A ROTATING DISK USING EPR4 DATA EQUALIZATION AND DETECTION TECHNIQUES

BACKGROUND OF THE INVENTION

1. Field of the Invention

This invention relates to improvements in mass data storage devices and methods for processing data in a read channel thereof, and more particularly to improvements in apparatuses and methods for detecting track identification indicia in accessing the data tracks of the device.

2. Relevant Background

Mass data storage devices include well known hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future. Mass data storage devices may also include optical disks in which the optical properties of a spinning disk are locally varied to provide a reflectivity gradient that can be detected by a laser transducer head, or the like. Optical disks may be used, for example, to contain data, music, or other information.

In the past, typically the track identification pulses are well separated from each other to enable them to be properly detected. However, there has been considerable recent pressure on disk drive manufacturers to increase the density of the data written to a disk to increase the capacity of the drive. Much effort has been directed to data detection techniques to increase the density of the data that can be contained on the disk. For example, maximum likelihood sequence detection (MLSD) and partial response (PR) filtering techniques have been developed that allow adjacent data pulses to at least partially overlap and still be properly detected. Moreover, EPR4 filtering techniques and Viterbi algorithms have been developed that efficiently implement MLSD and enable the data to be written more closely.

However, to the best of my knowledge, such EPR4 techniques have not been applied to the detection of track identification information.

BRIEF DESCRIPTION OF THE DRAWINGS

A preferred embodiment of the invention is shown in the accompanying drawings, in which.

In the various figures of the drawings, like reference numerals are used to denote like or similar parts.

SUMMARY OF THE INVENTION

According to a broad aspect of the invention, a method is presented for identifying a track of a rotating disk of a mass data storage device. The track identification indicia may be written more densely than the track identification indicia would have been written without using the EPR4 data equalization techniques, wherein track identification indicia pulses may at least partially overlap, for example to an extent beyond 30%, or more. The method includes reading track identification indicia recorded on the disk, and processing the read back track identification indicia using EPR4 data equalization techniques. Processing the detected track identification indicia may be performed using a Viterbi detector. The Viterbi may be used also to detect data pulses.

According to another broad aspect of the invention, a mass data storage device is presented. The track identification indicia of the device may partially overlap on a rotating disk of the device. The mass data storage device includes a read head selectively positionable to detect the track identification indicia and an EPR4 processor to process the detected track identification indicia. The EPR4 processor may be, for example, a Viterbi detector. The Viterbi detector may be configured, if desired, to include a trellis configured to detect only four possible basic data combinations or sub-sequences. The Viterbi may also be used, if desired, to detect data pulses.

DETAILED DESCRIPTION OF THE PREFERRED EMBODIMENTS

Figure 1:
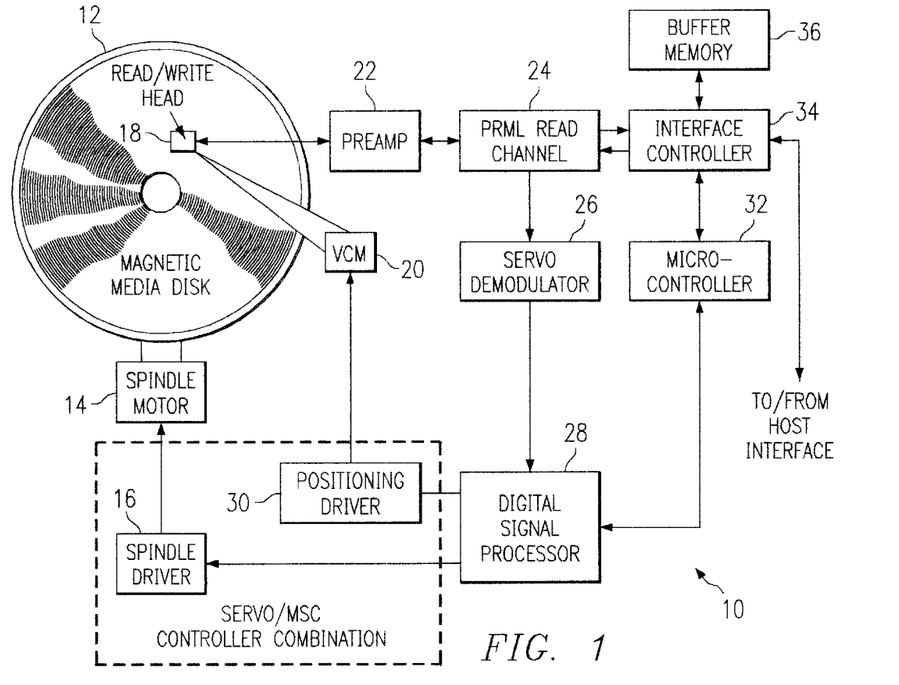
FIG. 1 is a block diagram of a disk drive system, illustrating the environment in which the invention may be practiced.

FIG. 1 is a block diagram of a disk drive system 10, which represents the environment in which the invention may be practiced. The system includes a magnetic media disk 12 that is rotated by a spindle motor 14 and spindle driver circuit 16. A data transducer or head 18 is selectably radially locatable by a voice coil motor (VCM) 20 to track along circumferential tracks of the disk, illustrated in FIG. 2, described below.

The tracks may contain magnetic states that contain information about the tracks, such as track identification data, location information, synchronization data, as well as user data, and so forth. The head 28 may be used both to record user data to and read user data back from the disk 12.

The head 28 also may be used to detect signals that identify the tracks and sectors at which data is written, and to detect servo bursts that enable the head to be properly laterally aligned with the tracks of the disk, as below described.

Analog electrical signals that are generated by the head 18 and preamplifier 22 combination in response to the magnetic signals recorded on the disk 12. These signals are preamplified for delivery to PRML (Partial Response Maximum Likelihood) read channel circuitry 24, details of which are described below with reference to FIG. 4. Servo signals, below described in detail, are detected and demodulated by one or more servo demodulator circuits 26 and processed by a digital signal processor (DSP) 28 to control the position of the head 18 via a positioning driver circuit 30. The servo data that is read and processed may be analog data that is interpreted by the DSP 28 for positioning the head 18.

A microcontroller 32 is typically provided to control the DSP 28, as well as an interface controller 34 to enable data to be passed to and from a host interface (not shown) in known manner. A data memory 36 may be provided, if desired, to buffer data being written to and read from the disk 12.

Figure 2:
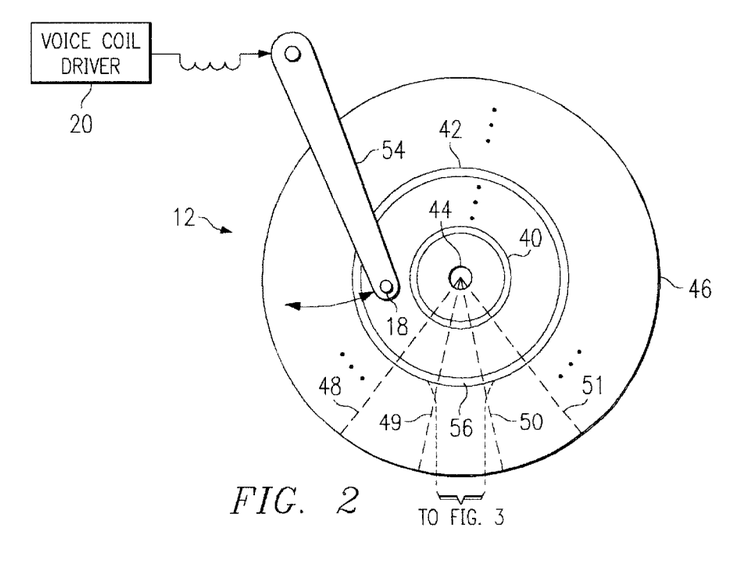
FIG. 2 is a diagram showing a typical arrangement of selectable radial tracks of the disk of FIG. 1.

The data rings of the disk 12 of FIG. 1 are illustrated in FIG. 2. The disk may be coated with a magnetic material to which data and other information are written in a number of concentrically located tracks or rings 40 . . . 42 . . . . The tracks typically contain user data sectors and servo sectors arranged in concentric cascading rings from the inside diameter 44 of the disk at the hub to the outside diameter 46 of the disk at the edge. Evenly spaced radial lines 48–51 are also shown emanating from the hub 44 to the edge 46. (The lines 48–51 do not actually exist in a physical device, but are shown for purposes of illustrating the alignment of the fields of the tracks, as described below.) The lines 48–51 correspond to the location of the servo sectors at each respective intersection of the lines 48–51 with the rings 40 . . . 42 . . . . Generally, there are two or more data sectors per servo sector.

A servo sector exists at the junction of each of the radial lines and its respective track. It should be noted that servo sectors are written by the disk drive manufacturer by a device known as a servo writer. These servo sectors are never re-written, in normal drive operation.

The read/write head is positioned by an arm 54 that is pivotally attached to allow the read/write head 18 to be radially moved inwardly and outwardly to selected radial distances of the disk 12 to tracks 40 . . . 42 . . . identified by the desired track identification number. The radial position of the read/write head arm is controlled in a known manner by the "voice coil" motor 20 that receives positioning signals from the positioning driver circuit 30.

Figure 3:
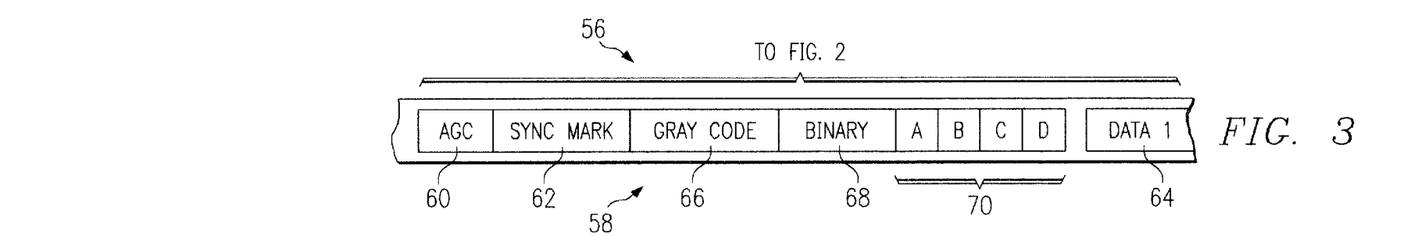
FIG. 3 is an expanded diagram showing a wedge portion of one of the rings or tracks within one of the tracks of FIG. 2, showing the various data areas therein.
Figure 5:
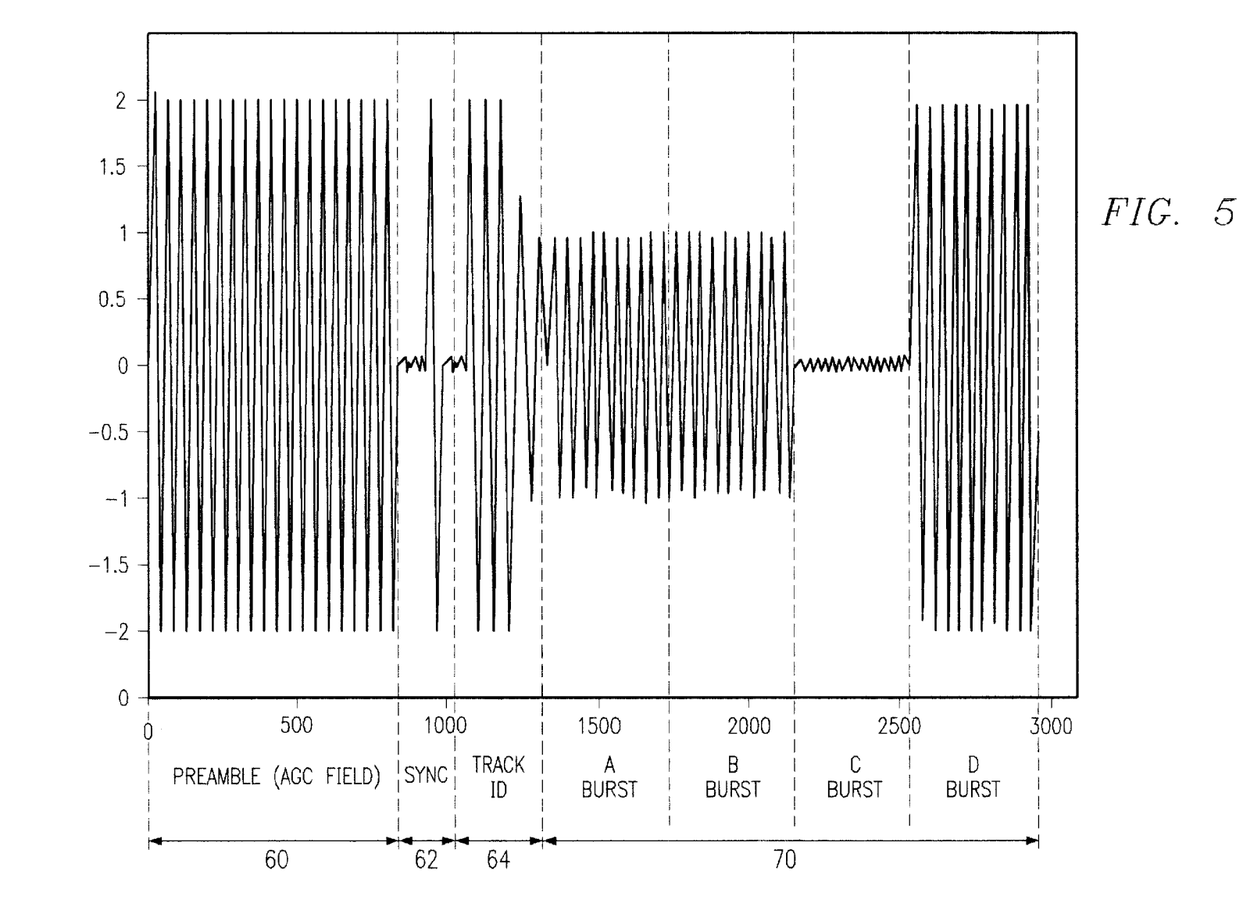
FIG. 5 is a graph showing the various signals of the wedge portion of FIG. 3.

The layout 56 of one of the rings or tracks within one of the sectors, is shown in FIG. 3, details of which are shown in FIG. 5 below. The sector portion may be identical to other sector portions that repeat continuously around the ring, and includes a number of servo sectors that separate respective user data sector regions. Each user data sector region may include a number of data sectors.

More particularly, each track has one or more servo sectors 58 located at spaced locations along the track. Each servo sector 58 has a number of fields, each for providing information for location or control of the head. Typically, for example, each servo sector includes a field that contains a preamble field 60, which, when read, enables AGC and timing circuitry associated with the disk to automatically adjust the gain in the head amplifiers and acquire the proper timing to enable the following data to be properly detected. The preamble field also is used to ensure that the trellis of the Viterbi detector starts in the correct state. Typically following the preamble burst is a field 62 that contains one or more sync marks so that the longitudinal position of the head relative to the track of interest can be determined. The sync marks 62 may be used, for example, to enable subsequent fields, such as the user data sectors 64 to be located by counting a predetermined elapsed time from the time that the sync marks are detected.

A Gray code field 66 may follow the sync mark field 62 in the servo sector 58. The Gray code field 66 may contain Gray code data from which the identification of the particular radial track over which the head is positioned can be established. Following the Gray code field 66 is a field 68 containing binary data, for example, to contain longitudinal track identification information, so that the identity of each track region between adjacent servo sectors can be established. The Gray code and the track identification information are referred to herein as "track identification pulses" or "track identification indicia." After the binary data field 68, a number, typically four, of burst fields 70 are presented for more precision alignment of the head laterally with respect to the selected track.

According to a preferred embodiment of the invention, a method is presented for identifying a track of a rotating disk of a mass data storage device. The tracks of the disk are identified by track identification indicia that are written onto the disk during manufacture using standard servo writing apparatuses, and, according to the invention, may be written with at least some of said track identification indicia pulses at least partially overlapping.

The track identification indicia that are recorded on the disk are read using the read head. Since the track identification indicia may partially overlap, merely using an amplitude peak detector may not properly discern between adjacent indicia. Thus, the signals that are developed by the read head are processed using EPR4 data equalization techniques. The EPR4 data equalization techniques enable the partially overlapping signals to be separated and decoded.

Thus, to practice the method of the invention, the track identification indicia or pulses do not have to be specially coded. Instead, they are merely written closer together than heretofore permitted using peak detection schemes. The indicia may be decoded by a Viterbi detector, preferably the same Viterbi detector that is used to decode the data that is contained on the track. However, since the track identification information can be contained in only four possible basic data combinations or sub-sequences, the Viterbi can be configured in track identification operation to detect only the necessary four sub-sequences. If additional sequences are required in normal operation, additional trellis states can be employed in the Viterbi. Of course, the track identification indicia are typically encoded with a Gray code to facilitate track seek operation. This invention does not change this; that is, the track identification information may still be encoded as it was in the past, and recorded more densely on the disk.

Figure 4:
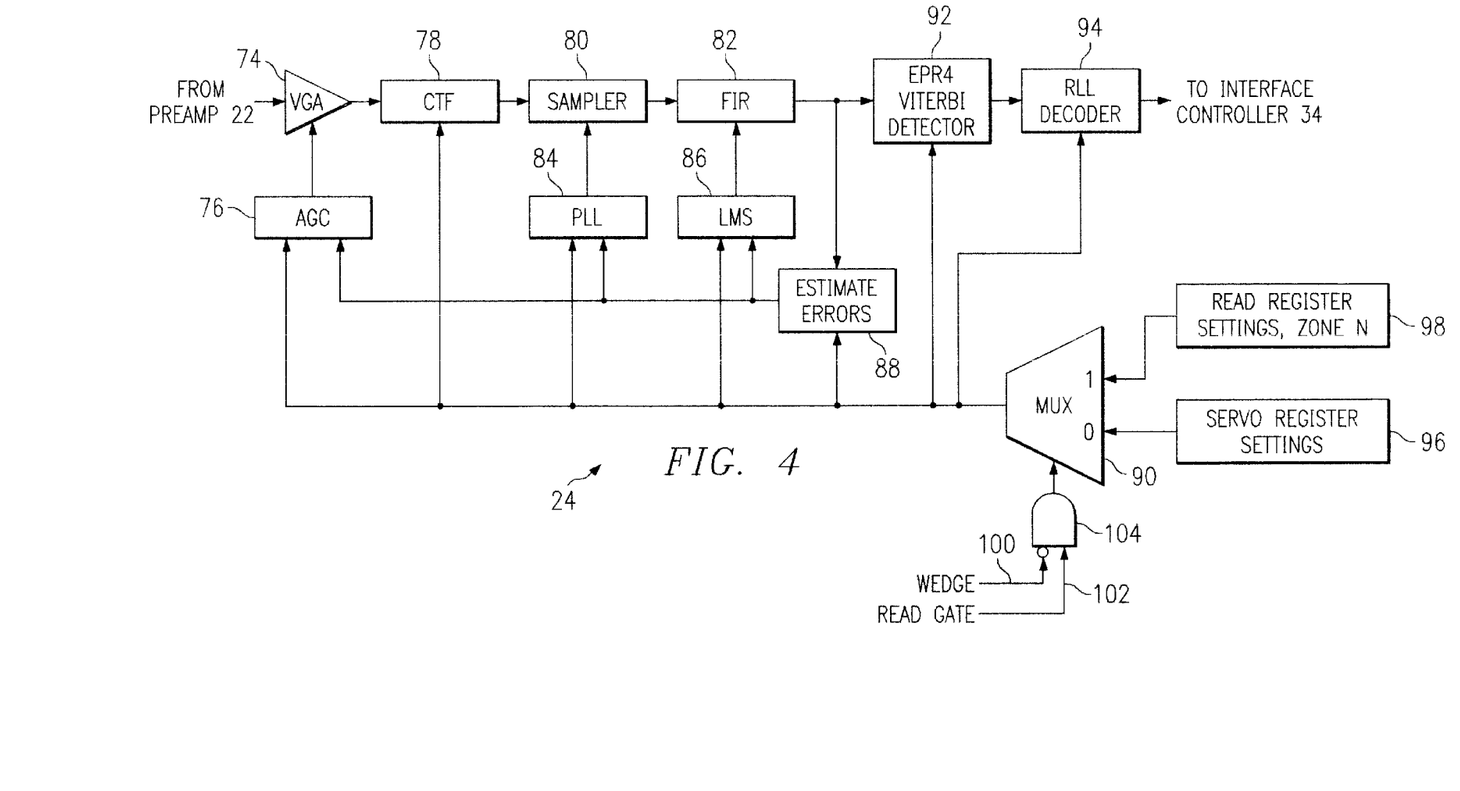
FIG. 4 is a block diagram of the read channel of FIG. 1, showing an embodiment in which the Viterbi detector thereof is selectively switchable from a track identification mode to a data detection mode.

To detect the track identification indicia, as well as the user data in the track being read, the read channel 24 may be configured in the manner shown in FIG. 4, to which reference is now additionally made. A variable gain amplifier (VGA) 74 of the read channel 24 receives input signals from the preamplifier 22, shown in FIG. 3. The variable gain amplifier 74 is in a feedback circuit that includes an automatic gain control circuit (AGC) 76 to control the amplitude of the detected signal to enable the remaining read channel circuitry to properly process it. The output from the VGA 74 is filtered, first with a continuous time filter (CTF) 78, then after being sampled by a sampler circuit 80, by a finite impulse response (FIR) filter 82. The output of the FIR filter 82 is fed back to the AGC 76 to control the gain of the VGA 74, but is also used to control the timing of the sampler 80 via phase locked loop circuit 84 and to control the coefficients of the FIR filter 82 via least means squared (LMS) adaptation circuit 86. Those skilled in the art will appreciate that there are other possible arrangements of these blocks. A circuit 88, denoted estimate errors, is used to modify the feedback signal in dependence upon the values produced at the output of the FIR filter 82 and the output of a multiplexer (MUX) 90, as below described.

The output from the FIR filter 82 is detected by an EPR4 Viterbi detector 92, details of which are also below described. The output from the EPR4 Viterbi detector 92 are then run-length-limited (RLL) decoded by an RLL decoder 94, to deliver the read channel output to the interface controller 34 (FIG. 1) and to the host (not shown).

According to one embodiment of the invention, the read channel circuitry of FIG. 4 can be switchably used to detect either the track identification indicia read from the disk 12 or the user data read therefrom. This is accomplished by the MUX 90, which has as one input the servo register settings 96, and which has another input the read register settings 98 for any particular zone, denoted "zone N". (A zone is a group of consecutive tracks that have the same data rate.) The output from the multiplexer controls the AGC 76, PLL 84 and LMS 86 feedback elements, as well as the EPR4 Viterbi detector 82 and RLL decoder 94. The selection between the servo register settings 96 and the read register settings 98 is controlled by whether a "wedge" signal 100 and a "read gate signal" 102 are applied to the MUX input via an AND gate 104.

In operation, when the "wedge" signal 100 is not applied and the read gate signal 102 is applied, the read register settings are applied to the MUX 90 to configure the circuitry of the read channel 24 to read the data from the disk 12, in normal fashion. On the other hand, when the "wedge" signal 100 is applied, the MUX 90 is configured to apply the servo register settings 96 to configure the read channel circuitry, and, in particular, the settings of the trellis of the Viterbi detector 92, to read and detect the track identification indicia read from the disk 12.

With reference now additionally to FIG. 5, the waveforms of the various fields of a servo "wedge" are shown. The binary field 68 of FIG. 2 has been omitted, for clarity. (It is noted that in many applications, various ones of the wedge fields may be rearranged or omitted, depending upon the particular setup of the drive on which the fields are used.) The waveforms of FIG. 5 are shown with an expanded horizontal time scale in FIG. 6, to which reference is now additionally made.

Figure 6:
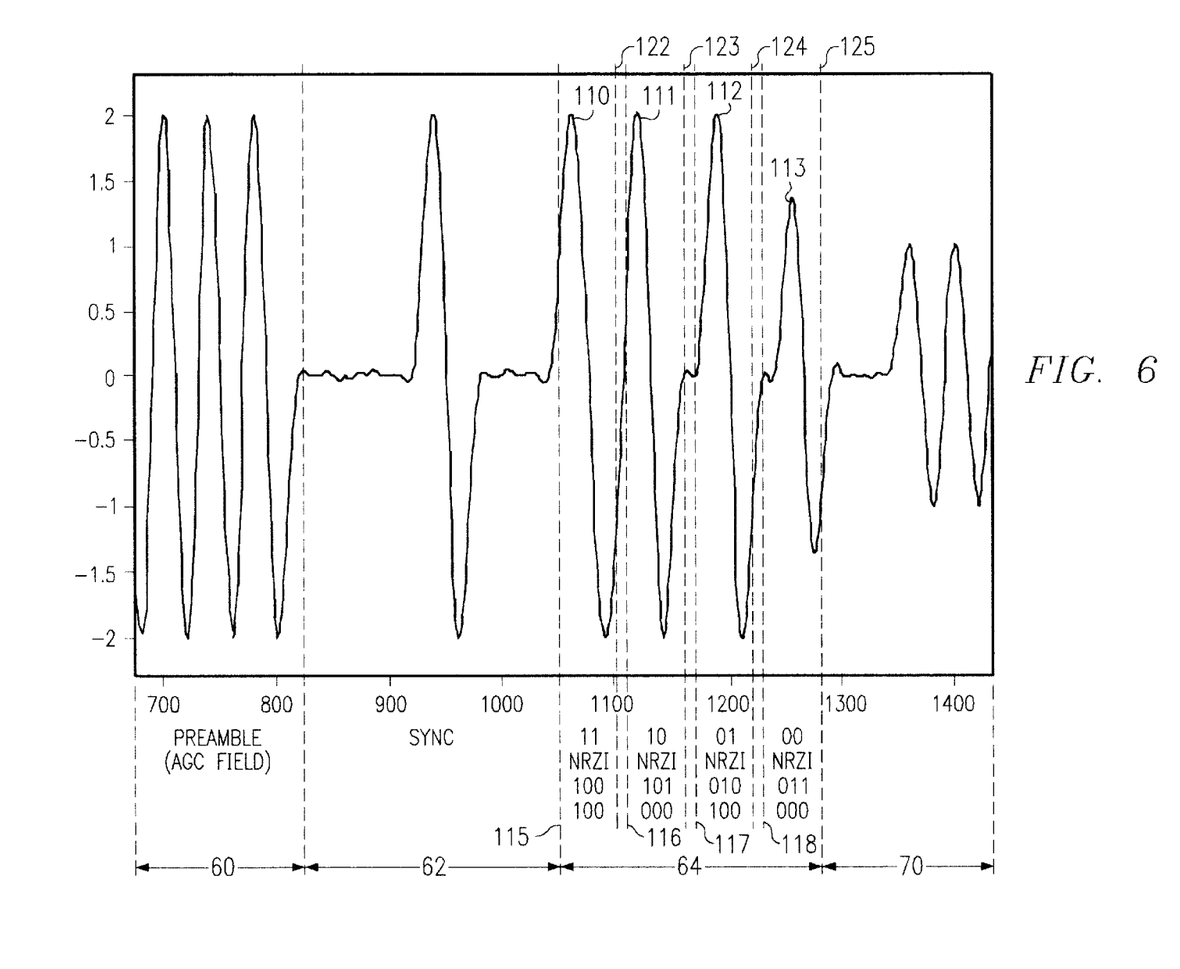
FIG. 6 is a time-expanded view of the preamble, sync and track ID portions of the graph of FIG. 5.

As mentioned, according to the invention, the waveforms of the track identification indicia 64 may be compressed and detected using EPR4 processing techniques. Thus, each of the NRZI (Non-Return-to-Zero Inverse) dibit encoded track indicia 110–113 are compressed from their normal width, indicated by vertical start time lines 115–118 to compressed time formats, shown by the respective stop time lines 122–125. This may, of course, result in overlap of dibit information, as shown by the waveforms 130–133 of FIG. 7, but which can nevertheless be discriminated and detected using EPR4 techniques. The waveforms 130–133 represent, respectively, the four data sub-combinations "11", "10", "01", and "00". It can be seen that the sample values for the di-bit waveforms shown are respectively "+1+2+1−1−2−1", "+1+20−2−10", "0+1+20−2−1" and "0+1+1−1−10".

The construction of the EPR4 Viterbi detector 92 to be enabled to detect the track identification indicia includes the modification of a standard EPR4 Viterbi detector that can detect any possible binary sequence, can be modified to selectively detects only those subsequences that represent track identification information.

Figure 7:
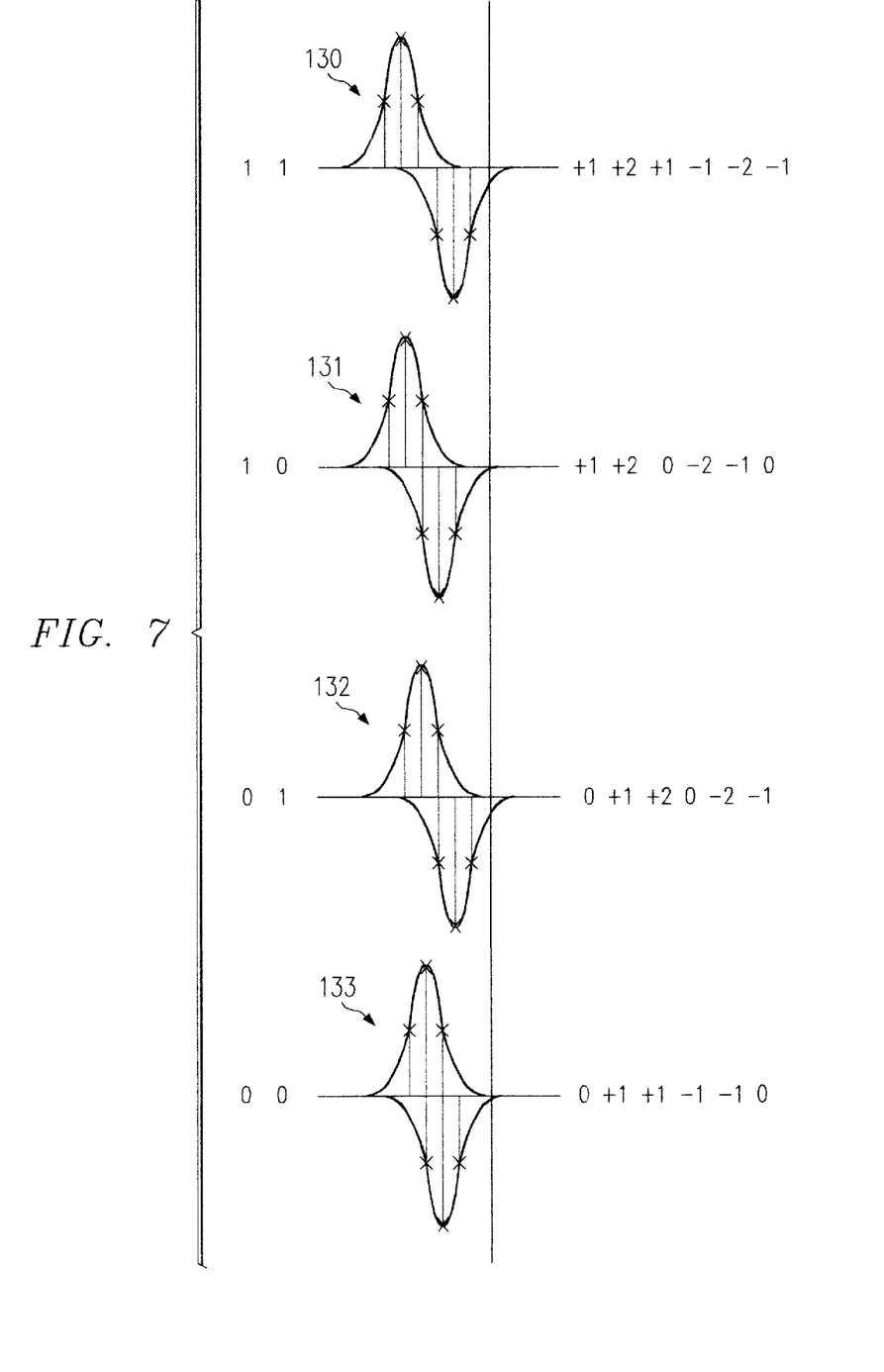
FIG. 7 is a set of graphs showing dibit signals to which the track identification information may be encoded, to enable subsequent detection using EPR4 detection techniques, according to a preferred embodiment of the invention.
Figure 8:
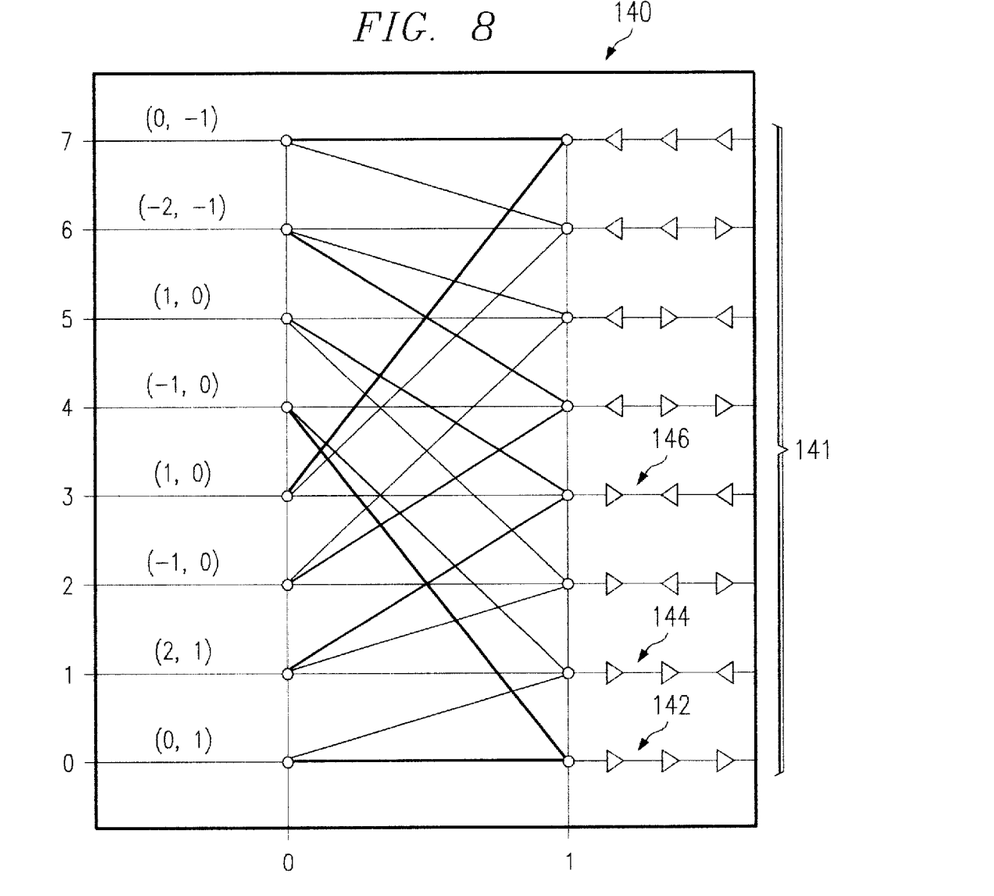
FIG. 8 is a state diagram of a particular EPR4 scheme for decoding the various NRZI track identification indicia combinations of FIG. 7, according to a preferred embodiment of the invention.

A state diagram 140 of a particular EPR4 scheme for decoding the various NRZI track identification indicia combinations of FIG. 7, according to a preferred embodiment of the invention, is shown in FIG. 8, to which reference is now additionally made. The magnetic domains that are written on the disk are represented by the arrows 141 on the right side of the diagram 140. The arrows are directed either to the right or left, depending upon the manner in which the encoded data was originally written, in known manner, and the various domain orientations correspond to the various states of the diagram. The domains are decoded in sets of three, beginning with zero, and shifting to the right one position as each additional domain from the disk is read.

For example, if the track identification data combination of "11", which is represented by NRZI 100100, has been recorded on the disk, the manner by which it is decoded is as follows. The state diagram 140 starts in state 0, in which the domain arrows 142 representing the history of the domains all point to the right. When the first domain of the NRZI sequence is read, it represents a domain change, corresponding the NRZI "1". Thus, the domain sequence becomes arrows 144 that now have the first two pointing right and the third pointing left. This corresponds to state 1. The next magnetic domain that is read shows no change in direction. This is seen in the diagram by arrows 146. No change in magnetic domain direction corresponds to an NRZI "0", and corresponds to state 3 in the diagram. This process is continued as the remaining magnetic domains are read and the NRZI code "100100" is decoded following the states of the state diagram 140.

The sample values corresponding to each state transition are determined by the number pairs on the left side of the state diagram 140. A zero NRZI value corresponds to the value on the left, and a one NRZI value corresponds to the value on the right. For example, following the decoded states of NRZI data representing a data combination "00", which is "011000", the sample values 0+1+1−1−10 result.

Figure 9:
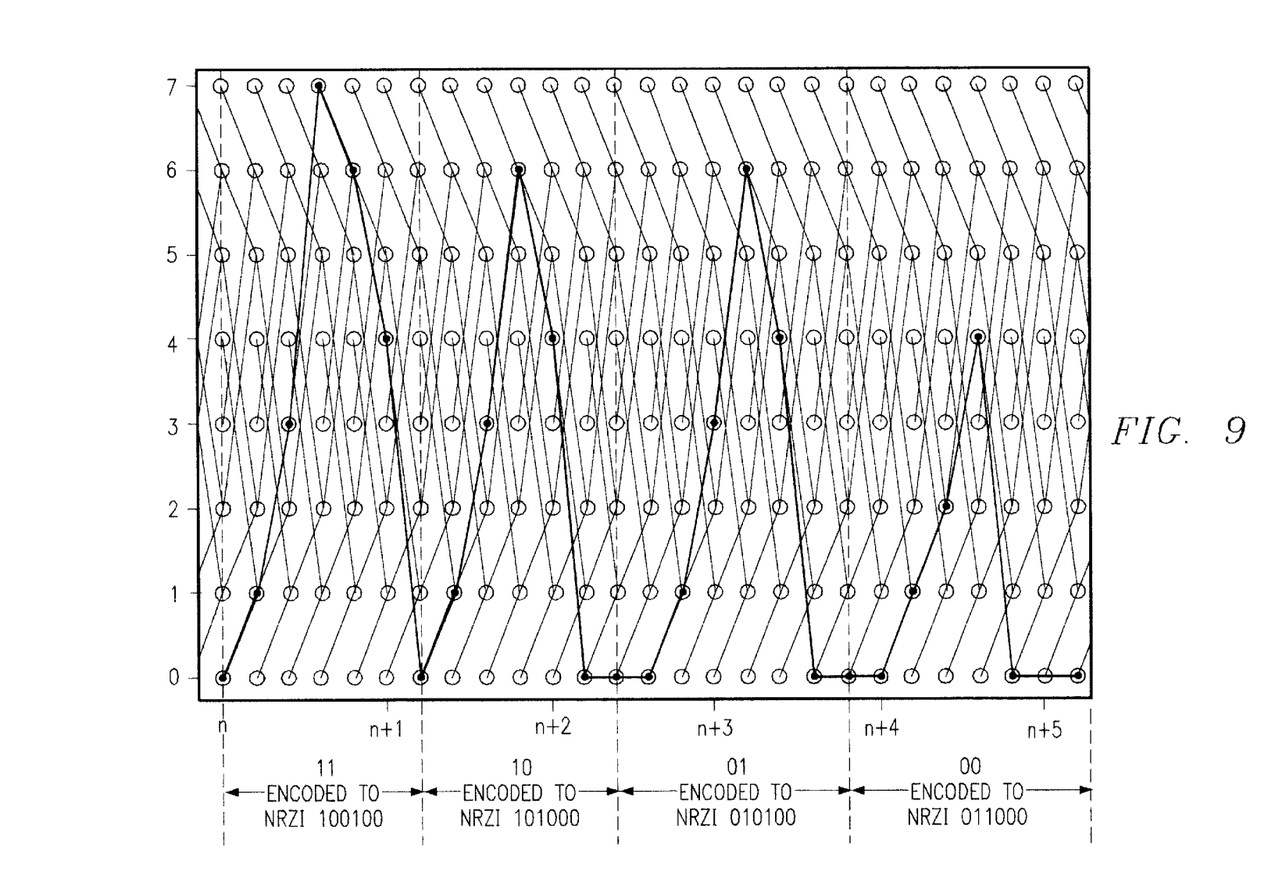
FIG. 9 is an NRZI trellis diagram that shows the detected paths that result from the decoding scheme of FIG. 8 for respective NRZI encoded data combinations, according to a preferred embodiment of the invention.

The state paths defined for each defined sequence are shown in the NRZI trellis diagram of FIG. 9, to which reference is now additionally made. Thus, the Viterbi trellis paths are outlined by the basic data combinations or sequences of the four possible track identification indicia, namely, 11, 10, 01, and 00. The track identification indicia are NRZI encoded, respectively, to 100100, 101000, 010100, and 011000. Each of these indicia can be developed from the state diagram 140, in the manner described above. As can be seen, state 0 is three magnets to the right (−1−1−1) and state 7 is three magnets to the left +1+1+1). Thus, the basic pairs of track identification information described above provide the basic building block from which an entire detector can be constructed. The four combinations correspond specifically to target value sequences.

Figure 10:
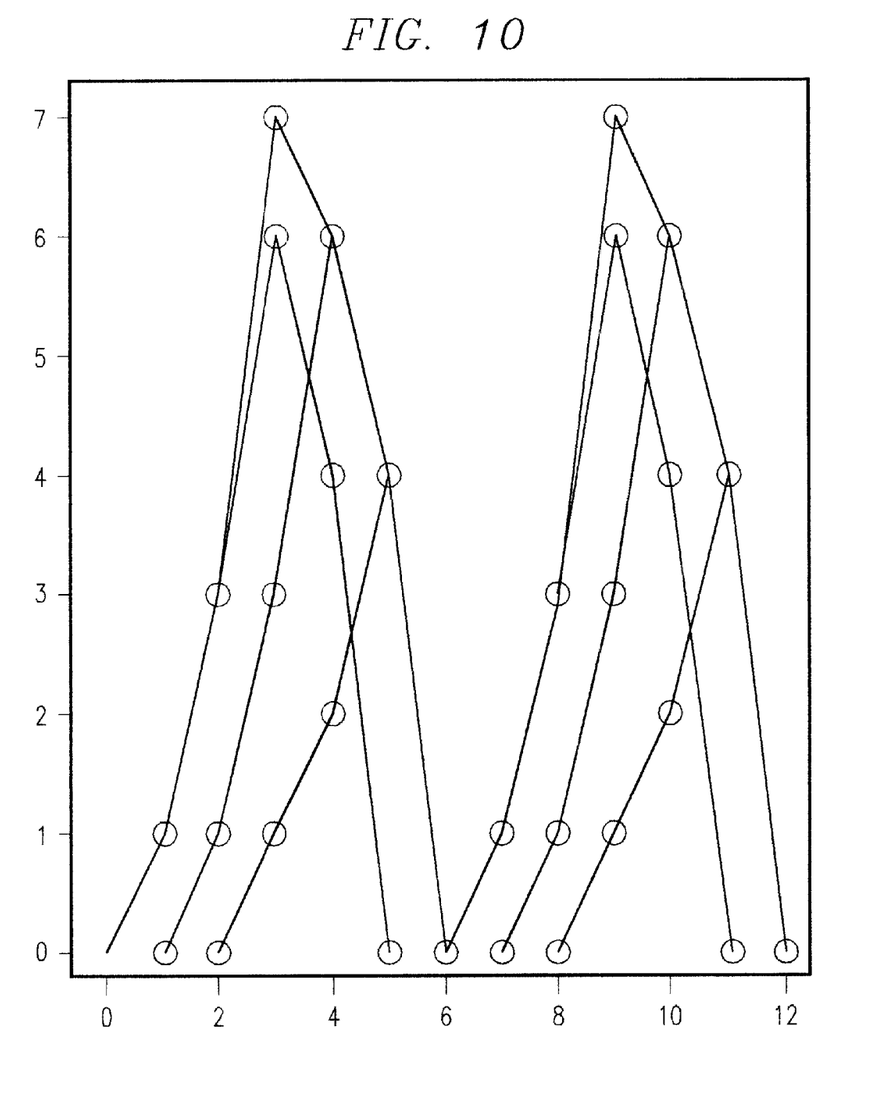
FIG. 10 is a diagram showing a time varying trellis structure for an eight-state EPR4 Viterbi detector, that can detect NRZI encoded track identification data combinations, with paths removed that do not correspond to valid coded di-bit sequences, according to another preferred embodiment of the invention.

FIG. 10, to which reference is now additionally made, is a diagram showing a time varying trellis structure for an eight-state EPR4 Viterbi detector, which can optionally be implemented to detect NRZI encoded track identification data combinations. The shapes of the various possible paths will be recognized to correspond to the shapes of the basic data combinations "11", "10", "01" and "00" described above with respect to FIGS. 8 and 9. In the trellis structure of FIG. 10, the di-bit sequences or paths that do not correspond to valid coded di-bit sequences are removed. Every sixth bit is forced to go through state 0. Thus, the six-sample structure shown repeats every $6^{th}$ bit throughout the track identification.

It will be appreciated that the EPR4 Viterbi detector used to detect track identification may be the same detector as used to detect data in normal operation. For example, in the trellis diagram of FIG. 9, all of the trellis states are present, and a Viterbi constructed to implement the trellis illustrated will detect the abbreviated track identification data as well. Preferably, however, the detector may be modified so that only the paths that will be encountered in the abbreviated track identification coding are used. This has a number of advantages; for example, in power savings, detection error reduction, and so forth.

The manner by which the EPR4 Viterbi detector may be switched to remove the unused paths in track identification mode preferably is by turning off the non-used paths of the Viterbi, or by adjusting the path weights of the Viterbi so that the non-allowed paths in a four-state embodiment do not occur. Of course, as will be apparent to those skilled in the art, other Viterbi trellis arrangements may be used.

It should be noted that although the invention has been described with specific reference to EPR4 techniques, it need not be limited strictly thereto. Thus, for example, the target values of EPR4 may have a 2:1 ratio between the absolute value of the smallest and largest non-zero sample values. However, a generalized target may also be used, which does not keep an integer relationship between the target values. For instance, a the pulse defined over a fixed number of sample values, such as three, may be used. The sample values may be "A", "B", and "C". In EPR4, "A" may equal 1, "B" may equal 2, and "C" may equal 1. Moreover, the negative portion of the pulse may still have different values, for example, "D", "E" and "F", where "D", "E", and "F" may, but not necessarily equal "-A", "-B", and "-C". This is referred to herein as "generalized EPR4," or "generalized eight-state" trellis decoding.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for identifying a track of a rotating disk of a mass data storage device, comprising:

detecting track identification indicia recorded on said disk using a read head; and processing said detected track identification indicia using a data equalization technique having at least three positive and three negative target values, wherein said three positive target values are normalized to 1, 2, and 1, and said three negative target values are normalized to −1, −2, and −3.

2. The method of claim 1 wherein said processing said detected track identification indicia comprises processing said detected track identification indicia using a Viterbi detector.

3. A method for identifying a track of a rotating disk of a mass data storage device, comprising:

detecting track identification indicia recorded on said disk using a read head; and processing said detected track identification indicia using a data equalization technique having at least three positive and three negative target values, wherein said three positive target values are other than 1, 2, and 1, and said three negative target values are other than −1, −2, and −3.

4. A method for identifying a track of a rotating disk of a mass data storage device, comprising:

detecting track identification indicia recorded on said disk using a read head; and processing said detected track identification Indicia using EPR4 data equalization techniques, wherein said processing said detected track identification indicia comprises processing said detected track identification indicia using a Viterbi detector, and wherein a trellis of said Viterbi detector is configured to detect only four possible information sequences.

5. The method of claim 4 wherein said Viterbi detector is also usable to detect data pulses.

6. The method of claim 5 herein said Viterbi detector is switchable to selectively detect either data pulses or track identification indicia.

7. The method of claim 5 wherein said Viterbi detector is time variable to include a repeating track identification trellis for detecting track identification indicia.

8. The method of claim 5 wherein said repeating track identification trellis has only allowed trellis states.

9. The method of claim 4 further comprising writing the track identification indicia more densely than said track identification indicia would have been written without using said EPR4 data equalization techniques.

10. The method of claim 4 further comprising writing the track identification indicia wherein track identification indicia pulses at least partially overlap.

11. The method of claim 9 wherein tracks of adjacent tracks are coded with a Gray code.

12. The method of claim 10 wherein tracks of adjacent tracks are coded with a Gray code.

13. A method for identifying a track of a rotating disk of a mass data storage device, comprising:

writing track identification indicia onto said disk with at least some of said track identification indicia pulses at least partially overlapping;

detecting said track identification indicia; and processing said detected track identification indicia using EPR4 data equalization techniques, wherein said processing said detected track Identification Indicia comprises processing said detected track identification indicia using a Viterbi detector, and wherein said Viterbi comprises a trellis configured to detect only four possible information sequences.

14. The method of claim 13 wherein said Viterbi detector is also usable to detect data pulses.

15. The method of claim 13 wherein tracks of adjacent tracks are coded with a Gray code.

16. The method of claim 14 wherein said Viterbi detector is switchable to selectively detect either detect data pulses or track identification indicia.

17. A mass data storage device, comprising:

partially overlapping track Identification indida on a rotating disk of said device;

a read head selectively positionable to detect said track identification indicia; and an EPR4 processor to process said detected track identification indicia, wherein said EPR4 processor comprises a Viterbi detector which includes a trellis configured to detect only four possible information sequences.

18. The mass data storage device of claim 17 wherein said EPR4 processor is also used to detect data pulses.

19. The mass data storage device of claim 17 wherein tracks of adjacent tracks are coded with a Gray code.

20. The mass data storage device of claim 18 wherein said Viterbi detector is switchable to selectively detect either data pulses or track identification indicia.

* * * * *